(No Model.)  2 Sheets—Sheet 1.

W. H. GRIFFITHS.
INTERLOCKING CONE PULLEY.

No. 589,989. Patented Sept. 14, 1897.

Witnesses,  Inventor
Henry Houghton  William H. Griffiths,
E. G. Emanuel  By Sylvenus Walker
  Attorney (No Model.) 2 Sheets—Sheet 2.

W. H. GRIFFITHS.
INTERLOCKING CONE PULLEY.

No. 589,989. Patented Sept. 14, 1897.

Witnesses
Henry Houghton
E. G. Emanuel

Inventor
William H. Griffiths
By Sylvenus J. Walker
Attorney

UNITED STATES PATENT OFFICE.

WILLIAM H. GRIFFITHS, OF MEDFORD, MASSACHUSETTS.

INTERLOCKING CONE-PULLEY.

SPECIFICATION forming part of Letters Patent No. 589,989, dated September 14, 1897.

Application filed October 7, 1896. Serial No. 608,118. (No model.)

*To all whom it may concern:*

Be it known that I, WILLIAM H. GRIFFITHS, of Medford, in the county of Middlesex and State of Massachusetts, have invented an improvement in interlocking adjustable cone-pulleys applied to parallel shafts or to two shafts or counter-shafts, as may be desired to accomplish the best results which may be attained by my invention, of which the following is a specification.

My invention relates to improvements in what are known as "expansible" pulleys, composed of two sections capable of relative movement. In practice these expansible pulleys are arranged upon shafts, the relative speed of rotation of which is to be controlled or regulated by simultaneously increasing the belt-running surface of the pulley upon one shaft and decreasing such surface of the pulley on the other shaft.

The invention has for its object to improve pulleys of this class to render them capable of more perfect and satisfactory operation; and to this end it consists in the novel construction, arrangement, and combination of parts hereinafter described and claimed, reference being had to the accompanying drawings, in which—

Figure 1:
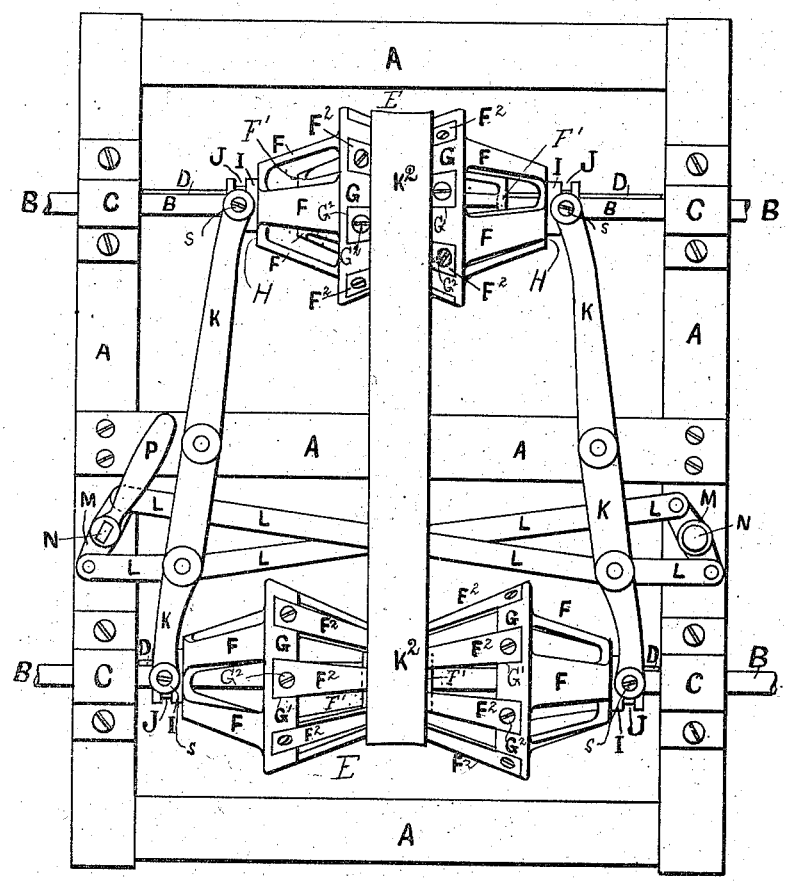
Figure 2:
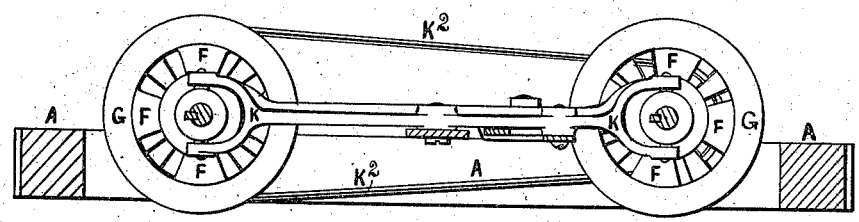
Figure 3:
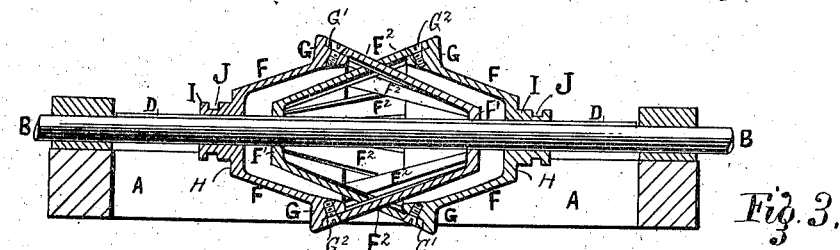
Figures 4, 5:
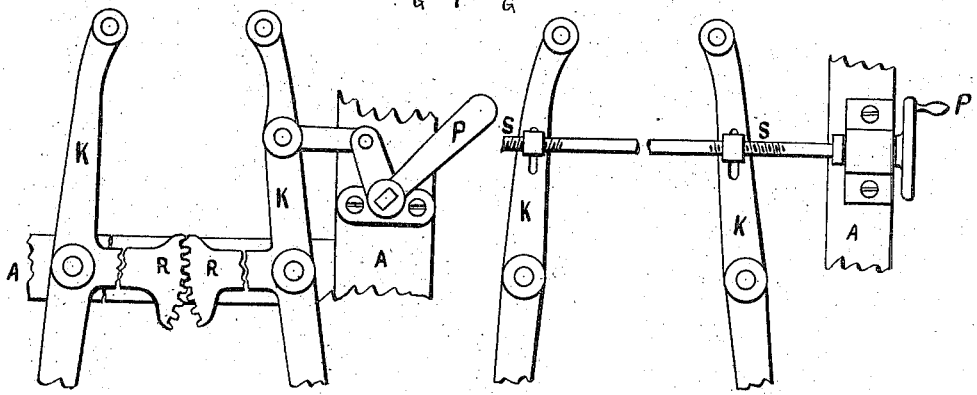

Figure 1 is a plan view of two pulleys constructed in accordance with my invention arranged upon two parallel shafts with connected operating mechanism. Fig. 2 is a sectional elevation thereof. Fig. 3 is a vertical longitudinal section of one of the pulleys arranged upon a shaft, the two parts thereof being adjusted to increase substantially to the extent of their capacity the belt-running surface of the pulley. Figs. 4 and 5 are broken detail plans showing different devices for adjusting the pulley-sections.

Pulleys of my invention are adapted for use in connection with shafts for driving machinery in the several arts and for speed adjustment of motor carriages or cars, and especially in such mechanisms where accuracy of rotation and nicety of adjustment are essential.

In the drawings I have illustrated two of the pulleys in useful operative relation, and in which the reference-letter A represents a supporting-frame and B two parallel shafts journaled in bearings or boxes C thereof. In practice one of these shafts will constitute a driver to which rotary motion may be imparted by suitable power, and the other will perform the function of a driven shaft, the relative speed of rotation of which is to be regulated or controlled. Each shaft B is provided with a feather D, to cause the pulleys to rotate therewith and yet permit of longitudinal adjusting movement thereon.

The reference-letter E designates my expansible pulley of improved construction, which is composed of two counterpart sections, as shown. Each section is composed of two parts, one part consisting of a head H, from which extends a hub I, having an annular groove J, adapted to be engaged by the pulley-adjusting mechanism, as hereinafter referred to. Projecting from said head H in the opposite direction is a flaring or frusto-cone-shaped open-ended shell F, preferably perforated at intervals of its circumferential wall for the sake of lightness and economy of material. The rim of the shell F is considerably thickened, as at G, and the thickened rim is provided with a series of seats G', arranged at intervals around its circumference. The other component part of this section of the pulley consists of a head F', formed with a series of integral separated fingers F², flaring outwardly therefrom and at their free ends resting in the seats G' of the thickened rim of the shell F, in which seats they are secured removably by screws G². In assembling the two counterpart sections composing the pulley the two heads F' are brought near together, with the fingers of one head passing into the spaces which separate the fingers of the other, and then the shells F are moved into juxtaposition with the seats G' in the thickened rims, registering with the free ends of the series of fingers F², so that the latter may rest in said seats, where they are secured by means of the screws G². The pulley may be assembled before or after it is mounted upon the shaft.

By my invention as thus described I have improved the construction of extensible pulleys in that the two parts composing each counterpart section of the pulley are separably connected together, enabling me to provide support for both ends of the separated fingers, whereby they remain firm under the tension of the transmitting-belt and afford no opportunity for the latter to slip. When, as heretofore, the ends of the fingers where they extend from the head F' in my improved pulley are allowed to be free or in the air, they give or spring under the tension of the belt, permitting the latter to slip, which has been found a serious defect in instances where accuracy of movement and nicety of adjustment are essential. It will be seen also that by my improved construction the sectional pulley can be easily assembled with its parts in operative relation and that it is readily separable for repair in case of injury.

Having described the construction of the improved pulley, I will now set forth the related means for relatively moving the counterpart sections to adjust the belt-running surface to regulate or control the relative speed of rotation of the shafts on which the pulleys are arranged.

A belt $K^2$ is trained over the pulleys to transmit motion from one to the other thereof, and, as before explained, the pulleys are splined upon the shafts, so that they rotate therewith, but are capable of movement longitudinally thereof.

Referring to Fig. 1 of the drawings, the reference-letter K designates a pair of shipper-levers, pivoted intermediate their ends upon the frame A. They are forked at their extremities and provided with studs s, engaging the grooves J of the pulley-hubs I, as shown. The letter L designates cross-bars pivoted at their opposite ends to the opposite ends of swivel-arms M, the latter being pivoted at N to the frame A. These cross-bars are also pivoted to the shipper-levers. To one of the swivel-arms M a handle P is secured, by manipulation of which the cross-bars are operated to cause the two ends of the shipper-levers connected to one pulley to approach or recede relative to one another and simultaneously therewith cause the opposite ends of said shipper-levers to recede or approach each other, whereby corresponding movement is imparted to the respective pulley-sections. Thus when the one pulley is collapsed to increase the other is extended to decrease the belt-running surface, so that the aggregate belt-running surface of the two pulleys remains constant and the relative speed of rotation of the pulleys may be changed without permitting slip of the belt.

In Figs. 4 and 5 of the drawings I have illustrated different arrangements for operating the shipper-levers K. In Fig. 4 the means consist of intermeshing segment-gears R, carried by said shipper-levers, a bell-crank handle P, mounted on the frame A, and a link $P^2$, connecting said handle with one of the shipper-levers. In Fig. 5 the means shown consist of a shaft S, journaled in the frame A, and provided with right and left hand screws engaging, respectively, with the two shipper-levers, and a handle for rotating said screw-shaft. The shipper-levers, when either the means shown in Fig. 4 or those of Fig. 5 are shown, are connected with the pulley-sections, as in Fig. 1 of the drawings, and, if found desirable, ball-bearings may be interposed in the connection.

I am aware that extensible pulleys, broadly considered, are not new with me and such therefore I do not claim.

Having thus described my invention, what I claim as of my invention is—

1. In an extensible pulley the combination of two counterpart sections each section consisting of a flaring shell provided with a hub and a rim formed with seats, and a head provided with integral, separated fingers resting at their free ends in said seats and removable means securing them therein, the fingers of one section passing into the spaces separating the fingers of the other section, substantially as described.

2. In an extensible pulley the combination of two counterpart sections, each section consisting of a flaring shell provided with a hub and a thickened rim formed with seats, and a head provided with integral, separated fingers resting at their free ends in said seats, removable means for securing them therein, the fingers of one section passing into the spaces separating the fingers of the other section, and shipper-levers engaging the said hubs, substantially as described.

WILLIAM H. GRIFFITHS.

Witnesses:
L. M. BURGESS,
L. R. STANLEY.